United States Patent [19]
Wakamoto et al.

[11] Patent Number: 5,107,500
[45] Date of Patent: Apr. 21, 1992

[54] DIAGNOSTIC EXPERT SYSTEM

[75] Inventors: Masaaki Wakamoto, Yokohama; Moo W. Kim, Kawasaki; Mitsunori Fukazawa, Yokohama; Takahiro Aramaki, Kawasaki, all of Japan

[73] Assignee: Fujitsu Ltd., Kawasaki, Japan

[21] Appl. No.: 340,243

[22] Filed: Apr. 19, 1989

[30] Foreign Application Priority Data

Apr. 20, 1988 [JP] Japan .................. 63-095727

[51] Int. Cl.⁵ .............................................. G06F 11/00
[52] U.S. Cl. ................................. 371/15.1; 395/916
[58] Field of Search .............. 364/200 MS File; 371/15.1; 395/50, 916, 922

[56] References Cited

U.S. PATENT DOCUMENTS

| | | | |
|---|---|---|---|
| 4,649,515 | 3/1987 | Thompson et al. | 364/900 |
| 4,654,852 | 3/1987 | Bentley et al. | 371/29.1 |
| 4,866,635 | 9/1989 | Kahn et al. | 364/513 |
| 4,881,230 | 11/1989 | Clark et al. | 371/20.1 |

FOREIGN PATENT DOCUMENTS 61-055777 3/1986 Japan .
62-175060 7/1987 Japan .

OTHER PUBLICATIONS

Needalman et al., Doc, A Computer Hardware Diagnostic, Prime Computer, Inc., 1987.
Sutter et al., Designing Expert Systems for Real-Time Diagnosis of Self-Correcting Networks, IEEE Network, 1988.
Waterman, A Guide to Expert Systems, pp. 249-259.

Primary Examiner—Jerry Smith
Assistant Examiner—Russell Cass
Attorney, Agent, or Firm—Staas & Halsey

[57] ABSTRACT

A diagnostic expert system is set up with a first diagnostic subsystem based on a maintenance technician's knowledge and a second diagnostic subsystem based on a design engineer's knowledge. If a fault cannot be located under the first diagnostic subsystem, the second diagnostic subsystem, which operates by using the result obtained from the first diagnostic subsystem is started so as to determine the location of the fault.

30 Claims, 15 Drawing Sheets

Fig. 6A

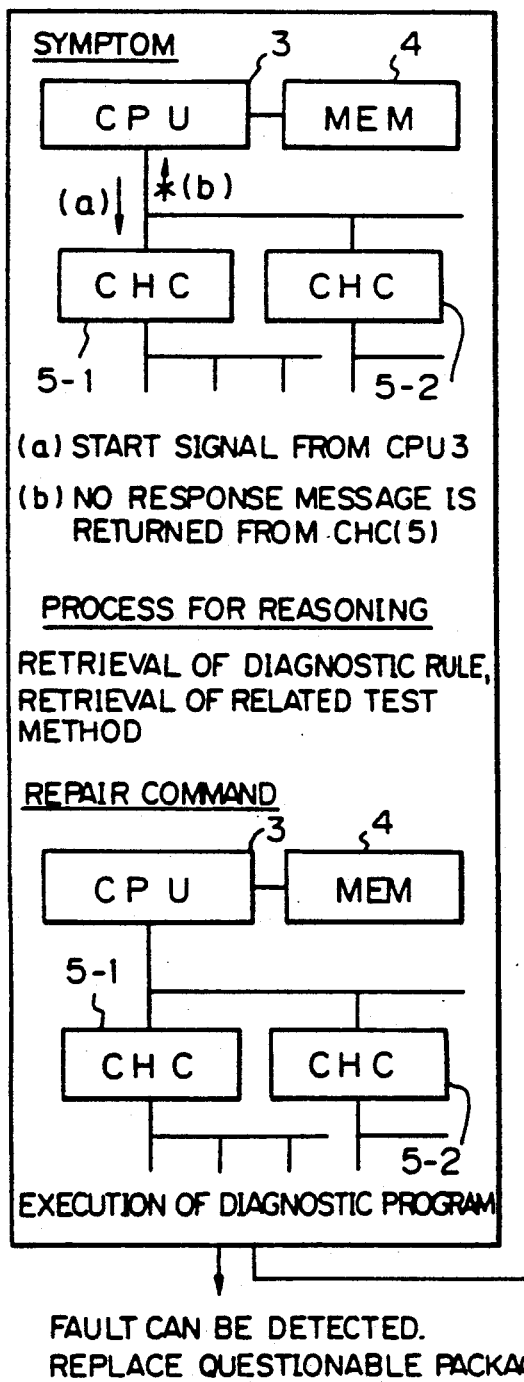

FAULT CANNOT BE DETECTED → Fig. 6B (a) START SIGNAL FROM CPU 3
(b) NO RESPONSE MESSAGE IS RETURNED FROM CHC(5)

PROCESS FOR REASONING

RETRIEVAL OF DIAGNOSTIC RULE, RETRIEVAL OF RELATED TEST METHOD (1) FETCH I/O CONTROL INSTRUCTION FROM MEMORY 4   X
(2) SELECTION OF CHC'S   O
(3) TRANSMISSION OF START SIGNAL   O
(4) EXECUTION OF START SEQUENCE   O
(5) RETURN OF RESPONSE MESSAGE   X

FAULT CAN BE DETECTED. REPLACE QUESTIONABLE PACKAGE

Fig. 10

| MEM CONTROL | |
|---|---|
| PART-OF | CPU #1 |
| ALK | AL1→INT-D ALK1 |
| PARTS | PLCCP |
| FAULT PROBABILITY | 0.02 |
| FUNCTION | |

| CPU-MEM INTERFACE | |
|---|---|
| PART-OF | MPR |
| ALK | MC11→BC11 ALK5 |
| PARTS | CABLE BWB |
| FAULT PROBABILITY | 0.01 |
| FUNCTION | |

DIAGNOSTIC EXPERT SYSTEM

BACKGROUND OF THE INVENTION

1. Field of the Invention

The present invention relates to a diagnostic expert system for diagnosing a data processing apparatus itself or a data processing apparatus to control some object, for example, a switching network in an exchange.

2. Description of the Related Art

The following explanation will be given taking a switching network as an example for easy understanding, however, the present invention is not limited to the same. High reliability and efficient operation of a communication network become important issues when providing high level communication services such as a commercial integrated service digital network (ISDN). In particular, rapid fault location and repair is essential because the damage can be great if network service is interrupted, and a powerful fault diagnostics expert system for repair support is required. The present invention proposes a new diagnostic expert system.

When a fault recurs among a variety of units comprising the exchange, generally a fault message is output to, for example, a maintenance console. Then, a diagnostic program corresponding to the fault message is executed Using the result of the executed program, an area causing the fault is determined based on a diagnosis dictionary. Next, a test is carried out for every function to locate a questionable object, e.g., a questionable package, which must then be replaced by a new one Such diagnosis must be completed correctly and rapidly.

In the prior art, as will be explained hereinafter in detail, a maintenance technician watches fault messages displayed on a console. Then he retrieves, according to the displayed contents, a manual book or diagnostic dictionary, so that he can replace packages located in the area where the questionable object is determined to exist, with new packages. Various known electronic parts, such as integrated circuits (IC's), are mounted on each package. With new package, a corresponding diagnostic command is input to make a diagnosis. The diagnosis is carried out repeatedly, and if the result is successful, the faulty package or packages can be replaced by a new one or new ones Finally the maintenance technicians introduce the new packages into the apparatus, to be diagnosed by the use of a so-called in-service command.

In actuality, the contents of the manual book and the diagnostic dictionary become complicated along with an increase of the size of the switching network system. Thus, it is not easy for the maintenance technicians to locate a fault based on the complicated diagnostic results. This makes it impossible to achieve rapid detection of the questionable package.

A diagnostic expert system has been proposed in which knowledge based on a maintenance technician's experience is expressed in an "IF-THEN" guided program through which knowledge relating to fault conditions is retrieved by the use of a reasoning engine. A questionable object is then located by using the retrieved knowledge.

As a first prior art example, Japanese Unexamined Patent Publication No. 61(1986)-55777 proposes diagnosis achieved by utilizing a diagnostic rule. As a second prior art example, Japanese Unexamined Patent Publication No. 62(1987)-175060 proposes diagnosis by utilizing a diagnostic knowledge data base which corresponds to a first knowledge data base according to the present invention, in which a maintenance technician's knowledge is contained.

In the prior art diagnostic expert systems, there is a first problem in that it is impossible to make a diagnosis regarding a fault which has never been experienced by a maintenance technician. A second problem is that it takes a very long time for a maintenance technician to locate a fault if the fault occurs outside the area which he can cover.

SUMMARY OF THE INVENTION

Accordingly, an object of the present invention is to provide a diagnostic expert system which can overcome the above mentioned problems, that is, rapid and correct location of a questionable faulty object.

To attain the above object, the diagnostic expert system according to the present invention combines two kinds of diagnosis, that is, a maintenance technician diagnosis, and a design engineer diagnosis.

BRIEF DESCRIPTION OF THE DRAWINGS

The above object and features of the present invention will be more apparent from the following description of the preferred embodiments with reference to the accompanying drawings, wherein:

FIGS. 6A and 6B are schematic diagrams for explaining the operation according to an embodiment of the present invention;

FIG. 10 depicts an example of a portion of system knowledge;

DESCRIPTION OF THE PREFERRED EMBODIMENTS

Before describing the embodiments of the present invention, the related art and the disadvantages therein will be described with reference to the related figures.

In, for example, an exchange, a duplex system is adopted in order to increase reliability. If a fault occurs in an active part of the duplex system, an interrupt by fault is issued to start corresponding processing for the fault. By this, a faulty unit is determined and the operation is switched to a stand-by part of the duplex system. After reconstruction of the duplex system, the operation is continued. If a fault occurs also in the part now the active one, the duplex system goes out of service. Therefore, it is important to locate the faulty unit rapidly and quickly repair it.

Figure 1:
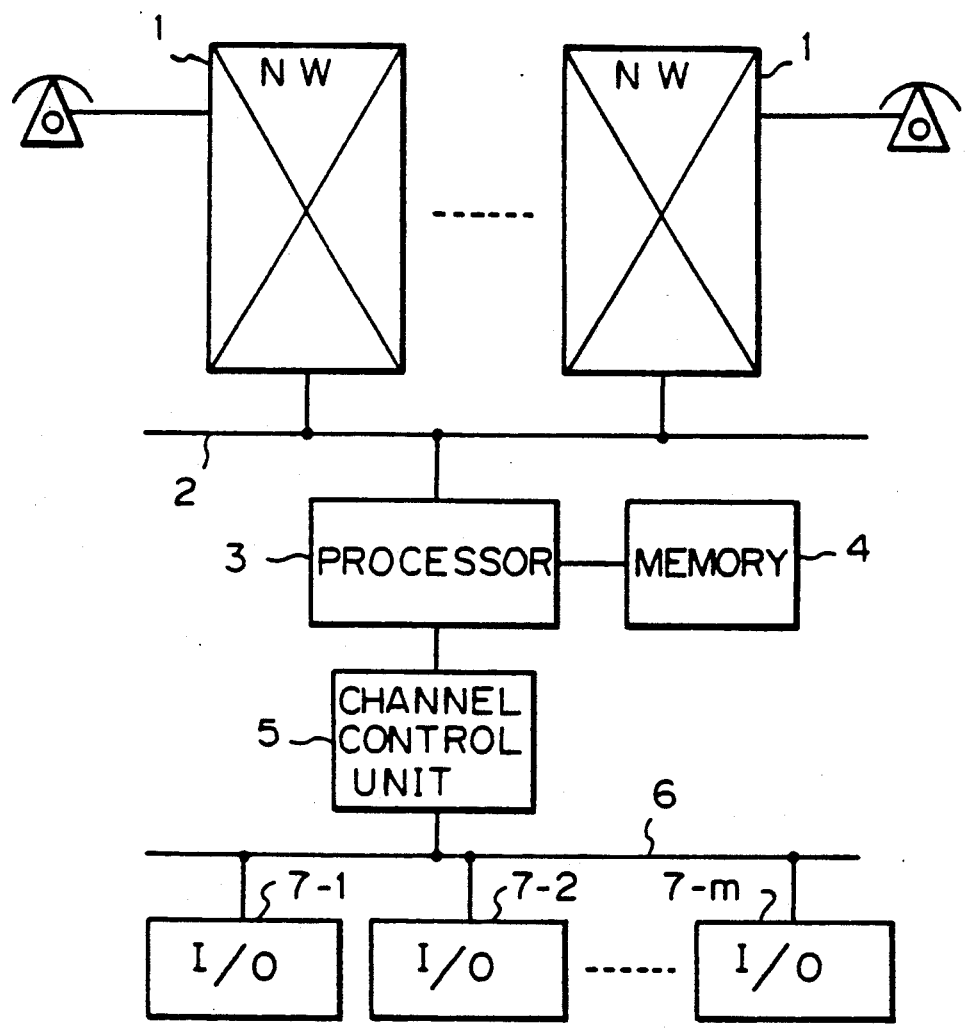
FIG. 1 is a block diagram illustrating a typical exchange system, as an example, for explaining an application of the present invention.

FIG. 1 illustrates a typical exchange system, as an example, for explaining an application of the present invention. The diagnostic expert system of the present invention is applied to a data processing apparatus having a control unit, a memory unit and input/output unit or units to be diagnosed. In FIG. 1, speech path switches 1 are controlled by the data processing apparatus via a speech path bus 2. Each switch 1 is provided with subscriber's telephone sets. The data processing apparatus is specifically constructed by a processor 3, as the control unit, a memory 4, as the memory unit, and input/output units (I/O's) 7-1, 7-2, . . . 7-m which are connected to the processor 3 by way of a channel control unit 5 and a common bus 6. The I/O's 7 can be, for example, a magnetic drum storage device, a magnetic tape storage device, a printing device, a console, and so on. The structure of the system is classified with a speech path system, including the speech path switches 1, and a central processor system, including the processor 3. Of these, the central processor system forms a duplex system.

The speech path system is controlled by the central processor system in accordance with a call processing program. In the central processor system, a fault processing program and a diagnostic program are stored, as a maintenance program. The switching network is supervised by the fault processing program to issue a fault message when some fault occurs. The diagnostic program is provided in the processor 3, the memory 4, the channel control unit 5, and so on, to specify, in each unit, a questionable package causing the fault, through the diagnosis.

According to general fault processing, an interrupt by a fault is generated to replace the fault unit with a stand-by unit, while a fault message including fault status is displayed on a console or printed out by a printing device. The maintenance technician inputs a diagnostic command to the processor conforming to the diagnostic message now issued. A diagnostic program is then started which is allotted to the fault unit specified by the parameter of the thus input diagnostic command. The resultant diagnosis and the resultant decision are displayed or printed out on the printing device. Based on the results, the maintenance technician retrieves a manual book or a diagnostic dictionary, as mentioned previously.

In the prior art diagnostic expert system, each fault and corresponding cause together with a questionable fault area are accumulated in a diagnostic knowledge data base in reference to fault circumstances experienced by the maintenance technicians. When a fault occurs, a questionable object is found based on the fault circumstances. This produces the aforesaid first problem that it is impossible to diagnose a fault never before experienced by a maintenance technician. This will be clarified below.

Figure 2:
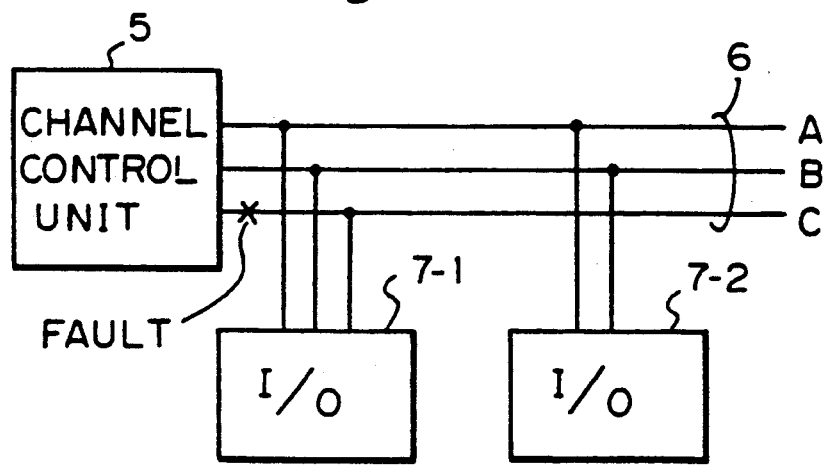
FIG. 2 is a block diagram illustrating part of a data processing apparatus for explaining an example of a fault.

FIG. 2 illustrates part of a data processing apparatus for explaining an example of a fault. The fault occurs, in the example, outside the area which can be covered by the maintenance technicians. In FIG. 2, the common bus 6 has three kinds of signal lines A, B and C. The channel control unit 5 and the input/output units 7-1 and 7-2 are connected via these signal lines A, B, and C. As seen in the figure, the I/0 unit 7-1 is connected with the signal lines A, B, and C, and the I/0 unit 7-2 is connected with the signal lines A and B. Here, assuming that a fault occurs at a portion marked with "X" on the signal line C during a communication between the unit 5 and the unit 7-1, a normal communication therebetween can no longer be maintained. In this case, under the diagnostic expert system based on the maintenance technician's knowledge, it is impossible to distinguish whether the fault occurs on the common bus or in the I/0 unit 7-1. This produces the aforesaid second problem that the fault may occur outside the area that a maintenance technician can cover.

According to the present invention, the fault diagnosis is achieved by further employing a design engineer's knowledge regarding the structure and the function of the apparatus to be diagnosed. This will be clarified with reference to the following drawings.

Figure 3:
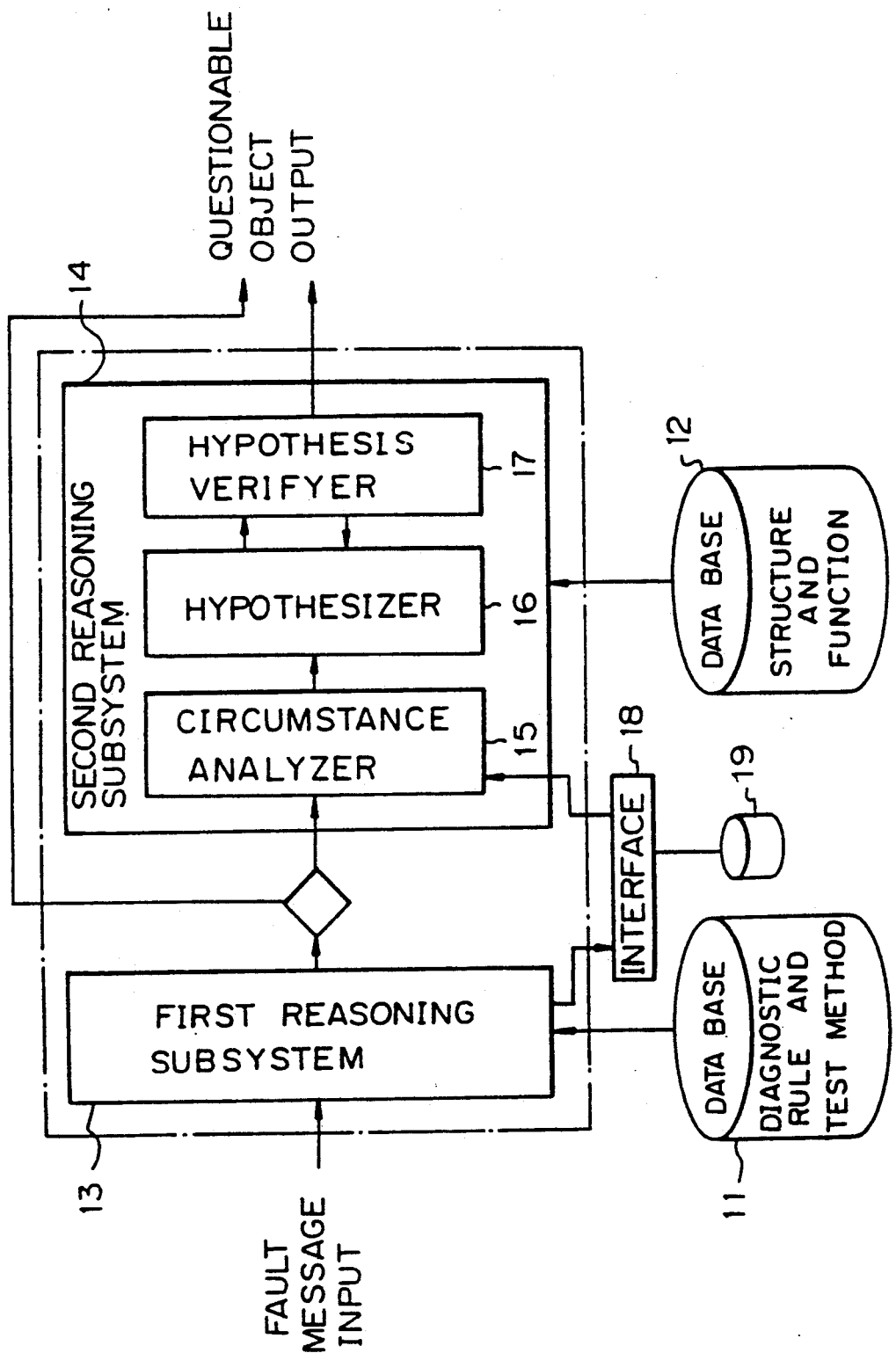
FIG. 3 is a schematic block diagram showing the principle of the present invention.

FIG. 3 illustrates a schematic block diagram showing the principle of the present invention. Basically, the diagnostic expert system is comprised by two diagnostic means. A first diagnostic means determines a questionable object based on both a fault message and diagnostic data and diagnosis the questionable object. A second diagnostic means hypothesizes the questionable object based on said structure data regarding the data processing apparatus, whereby a related fault object is specified by the first diagnostic means and also, if the object cannot be specified by the first means, by the second diagnostic means.

Specifically, the present invention comprises a first knowledge data base 11 containing diagnostic rules and test methods created by maintenance technicians. The diagnostic rules define causes of each fault in connection directly with the respective fault messages. A second, knowledge data base 12, created by design engineers, contains data relating to the structure and function of the data processing apparatus. A first reasoning subsystem 13 performs reasoning to locate a questionable object liable to cause the fault with reference to the first knowledge data base 11. A second reasoning subsystem 14 performs reasoning to locate the questionable object with reference to the second knowledge data base 12. The questionable object is reasoned by use of the first reasoning subsystem 13 according to the fault message, and if no questionable object is found by the reasoning, a circumstance analysis is carried out by use of the second reasoning subsystem 14 with reference to the result produced by the first reasoning subsystem 13. According to the analysis, and a hypothesis regarding the questionable object is generated and verified to find the target faulty object.

For this purpose, the second reasoning subsystem 14 is set up with a circumstance analyzer 15, a hypothesizer 16, and a hypothesis verifier 17. The second reasoning subsystem 14 utilizes the results produced in the first reasoning subsystem 13. The results are stored in a buffer memory 19 via a reasoning interface 18.

To be specific, in the first reasoning subsystem 13, the questionable object is retrieved by use of the first knowledge data base 11 which stores therein the diagnostic rules and the related test method created by utilizing knowledge of the maintenance technicians. Each of the diagnostic rules (diagnostic data) is defined by a fault message in correspondence with a related questionable object. Further, each of the structure data defines a relationship between the units comprising the data processing apparatus in accordance with the design information for constructing the data processing apparatus.

If a questionable object is not successfully specified, the second reasoning subsystem 14 is activated, wherein a fault circumstance is analyzed by the use of the second knowledge base 12 having stored therein the knowledge regarding the structure and function given by the design engineer. According to the analysis, a hypothesis of the questionable object is generated in the hypothesizer 16. Whether the hypothesis is correct or not is verified by the hypothesis verifier 17. If the result of the verification supports the hypothesis, the questionable object is determined to be the target fault. The design information consists of data including each combination of both a relationship and connection between the units comprising the data processing apparatus.

Figure 4:
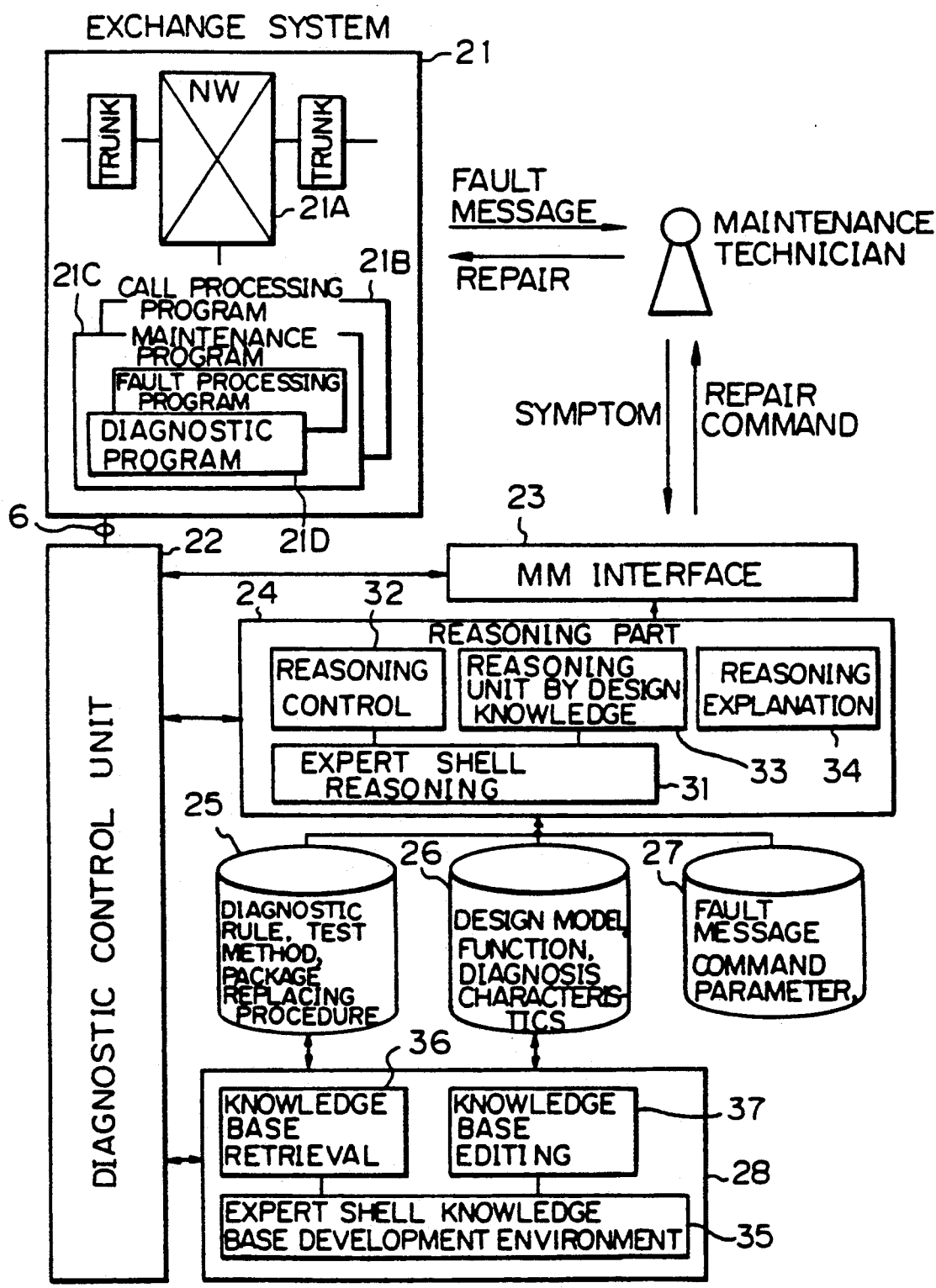
FIG. 4 is a schematic block diagram of a system according to an embodiment of the present invention.

FIG. 4 illustrates a schematic block diagram of a system according to an embodiment of the present invention. In FIG. 4, reference numeral 21 represents an exchange system, 21A a speech path network, 21B a call processing program, 21C a maintenance program, 21D a diagnostic program contained in the maintenance program 21C, 22 a diagnostic control unit for controlling an overall diagnostic expert system, 23 a man-machine (MM) interface unit, 24 a reasoning part, 25 a first knowledge data base created from the knowledge of a maintenance technician, 26 a second knowledge data base created from the knowledge of a design engineer, 27 a data base, 28 a knowledge data base management unit, 31 an expert shell reasoning unit, 32 a reasoning control unit, 33 a reasoning unit based on the knowledge of a design engineer, or, a design knowledge reasoning unit, 34 a reasoning explanation unit, 35 an expert shell knowledge data base development environment, 36 a knowledge data base retrieving unit, and 37 a knowledge data base editing unit.

The first knowledge data base 25 stores therein data, such as diagnostic rules, test methods, package replacing procedures and the like. The second knowledge data base 26 stores therein data, such as design models, functions of each unit of the data processing apparatus, diagnosis characteristics of each unit and the like, which are created from the knowledge of a design engineer. The data base 27 stores therein data, such as the fault messages, command parameters and the like.

The first reasoning subsystem, shown by 13 in FIG. 3, is comprised of, in FIG. 4, the reasoning part 24 which contains therein the expert shell reasoning unit 31, the reasoning control unit 32 and the reasoning explanation unit 34 which explains the process of the reasoning to the maintenance technician.

The second reasoning subsystem, shown by 14 in FIG. 3, is comprised of, in FIG. 4, the reasoning control unit 32, the reasoning unit based on the design knowledge or, a design knowledge reasoning units and the aforementioned reasoning explanation unit 34.

The diagnostic rules, stored in the first knowledge data base 25, define each questionable object in correspondence with the variety of the fault messages. For example, the diagnostic rule is defined such that, IF: fault message No.=18, THEN: questionable object may be processor 3 or channel control unit 5.

Where, the fault message No.=18 indicates that there is no response from the channel control unit 5.

The aforesaid test method is defined such that,

IF: questionable unit is the channel control unit 5,

THEN: execute a diagnostic program.

Other examples of the aforesaid diagnostic rule will supplementally be given in the following table.

TABLE

| FAULT MESSAGE | QUESTIONABLE UNIT |
|---|---|
| No response from the channel control unit 5 | processor 3 or channel control unit 5 |
| Parity check error of the memory 4 | processor 3 or memory 4 |
| input/output error | channel control unit 5 or input/output unit 7 |

The design model stored in the second knowledge data base 26 provides information regarding structure, especially structural connections between the processor 3, the channel control unit 5, the memory 4 and so on in terms of pointers. The term pointer means an address link, as will be explained with reference to FIGS. 8A, 8B and 8C. Each function stored in the second knowledge data base 26 expresses the function of each unit. As an example, the function of processor in the exchange system example might be expressed as follows:

(1) Reading, from the memory 4, a control instruction for the input/output unit 7;

(2) Selecting one of a plurality of channel control units 7-1, 7-2 . . . 7-m;

(3) Issuing a start signal, and so on.

The function of the channel control unit 7 in the exchange system example, might be expressed as, (1) Receiving the start signal;

(2) Execution of a start sequence;

(3) Returning a response message, and so on.

The first and second knowledge data bases 25 and 26 are managed by the knowledge data base management unit 28, so that the knowledge of the maintenance technicians and the knowledge of the design engineers are controlled to be edited, accumulated and retrieved.

The diagnosis according to the present invention is mainly applied to the data processing apparatus including the processor 3, the memory 4, the channel control unit 5 and the input/output units 7. The data processing apparatus controls, for example, the exchange system 21 of FIG. 4. The speech path network 21A is controlled to set up a speech path or release the speech path under control of the call processing program 21B. Further, the maintenance program 21C contains the fault processing program and the diagnostic program 21D and so on. The exchange system 21 is supervised by the fault processing program. If a fault, such as a parity check error, is detected, the fault message is issued. Upon recognition of the thus issued fault message by the maintenance technician, the related command is generated or a self diagnostic program 21D is automatically started. Incidentally, in a case where a fault such as a no dial tone occurs and the subscriber in question notifies the maintenance technician of that fact, the maintenance technician can input a related command by himself.

Furthermore, the MM interface unit 23 is comprised of a display device or keyboard to which the command input and the input indicating a symptom conforming to the fault message are input. Also, the MM interface displays repair commands to the maintenance technician according to the result and diagnosis. The repair command is displayed in a multiwindow mode, for example.

Figure 5A:
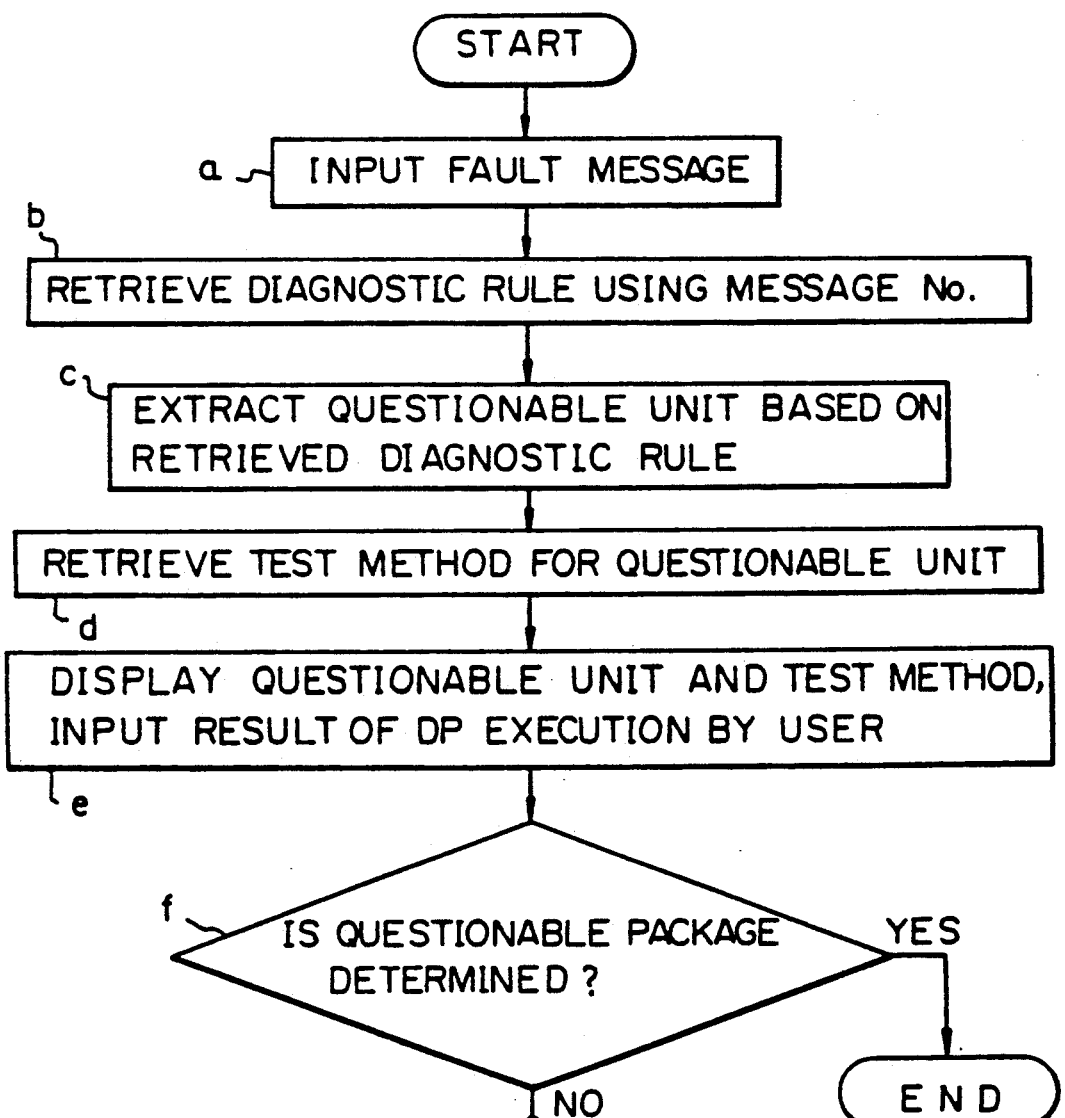
FIGS. 5A and 5B are flow charts of general procedures according to an embodiment.
Figure 5B:
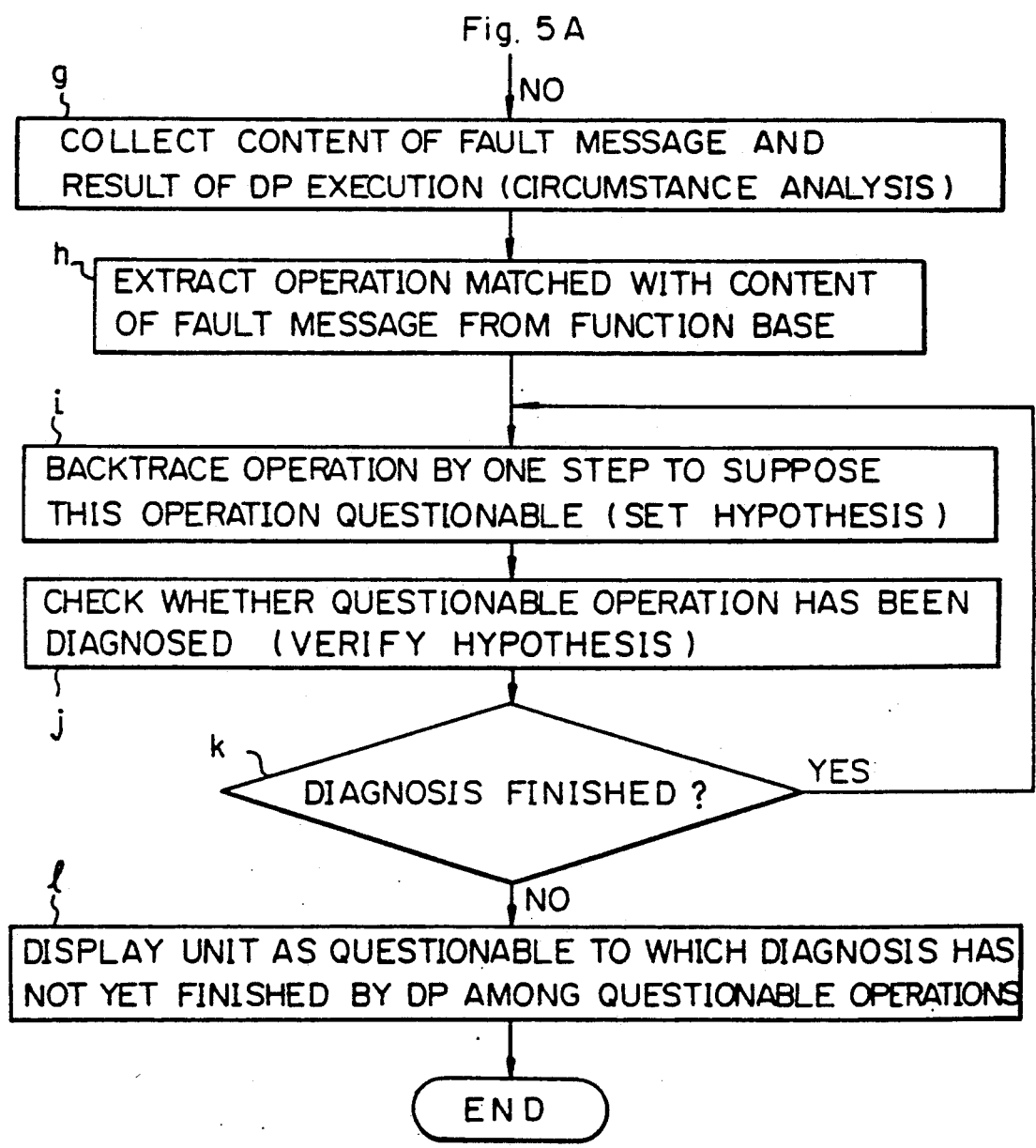

FIGS. 5A and 5B are flow charts of a general procedure according to an embodiment of the present invention. In general, the first diagnostic means (13) includes a first part and a second part; the first part receives a fault message to translate the same into a corresponding fault number and retrieve a diagnostic rule using the translated fault number. The second part identifies the questionable object based on the thus retrieved diagnostic rule and starts executing a test program corresponding to the questionable object to make a self diagnosis. The second diagnostic means (14) includes third, fourth, and fifth parts. The third part identifies a unit corresponding to the fault message as a questionable object based on the result given by the first diagnostic means. The fourth part performs a backtrace of the processing procedure step by step with respect to the thus identified questionable object. The fifth part specifies the questionable object according to the result of the preceding self diagnosis achieved in the first diagnostic means (13). According to the flow charts of FIGS. 5A and 5B, the reasoning part (shown by 24 in FIG.4) watches the input fault message (step "a"); retrieves the corresponding diagnostic rule using the fault message number (No.) (step "b"); identifies a questionable unit based on the thus retrieved diagnostic rule (step "c"); retrieves a test method for the questionable unit (step "d"); displays the retrieved questionable unit and the related test method and then inputs the result of the diagnostic program (DP) execution by a user (maintenance technician) (step "e"). According to the result of the DP execution, the reasoning part judges whether the target questionable package is correctly determined (step "f").

In other words, when a fault message responding to an occurrence of a fault is generated, an automatic fault message input or an input via the MM interface unit 23 by the maintenance technician is started. By this, the first reasoning subsystem 13 (comprising the expert shell reasoning unit 31, the reasoning control unit 32 and the reasoning explanation unit 34) retrieves the first knowledge data base 25 using the fault message number (No.), retrieves the diagnostic rule corresponding to the fault message number (No.), and identifies the questionable object according to the diagnostic rule. Here, assuming that the questionable units are, for example, both the processor 3 and the channel control unit 7, the questionable units and also the corresponding test method are displayed on the MM interface unit 23, such as, for example, "EXECUTE DIAGNOSTIC PROGRAM FOR BOTH PROCESSOR AND CHANNEL CONTROL UNIT".

If the questionable package is specified through the execution of the self diagnostic program, the step "f" in FIG. 5A progresses through the route to "YES", and therefore, the processing by the reasoning part 24 comes to an end. Contrary to this, if the questionable package is not determined in step "f", the second reasoning subsystem 14 is activated. This subsystem 14 performs reasoning using the second knowledge data base 26 created by the design engineer. That is, first, the content of the fault message and also the result of the diagnostic program (DP) execution are collected to perform a circumstance analysis (step "g"). Then, an operation matched with the content of the fault message is extracted from the function data base (step "h"). Next, a backtrace of the thus extracted operation is achieved by one step to set a hypothesis in which the backtraced operation (step) is questionable (step "i"). Thereafter, it is checked whether the diagnosis for the questionable operation has been finished (step "k"). If the result of step "k" is NO, a unit among the units which have not yet been diagnosed by the diagnostic program is displayed as a questionable unit on the MM interface unit 23 (step "l"). To the contrary, if the result of step "k" is YES, the backtrace advances by one further step and the thus backtraced operation (step) is set as a new hypothesis in which the step is questionable.

In other words, according to the input by the maintenance technician or the resultant diagnosis by the first reasoning subsystem (13), the reasoning control unit 32 controls shifting the processing from the first reasoning subsystem (13) to the second reasoning subsystem (14). By this, the reasoning part based on the design engineer's knowledge is started, whereby the detection of the questionable object is carried out while retrieving the second knowledge data base 26. In this case, according to the result of the circumstance analysis, the design model, the function of the unit and so on, stored in the second data base 26, are retrieved and a hypothesis is made regarding the questionable unit. It is then verified whether the hypothesis is correct or not, at which point the diagnostic program is executed for the questionable unit or units which have not yet been subjected to the diagnostic program, so that a target questionable unit is found.

Figure 6B:
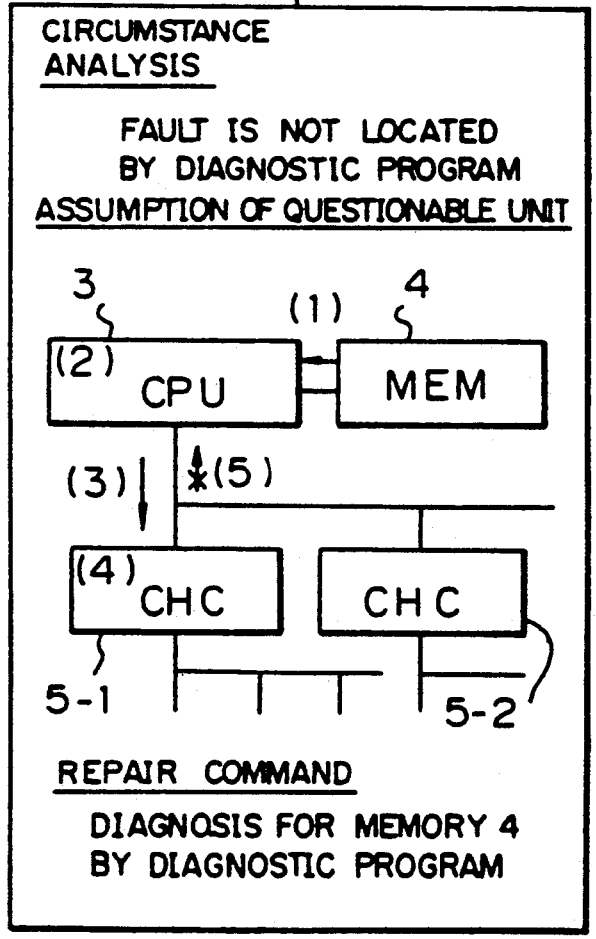
Figure 7:
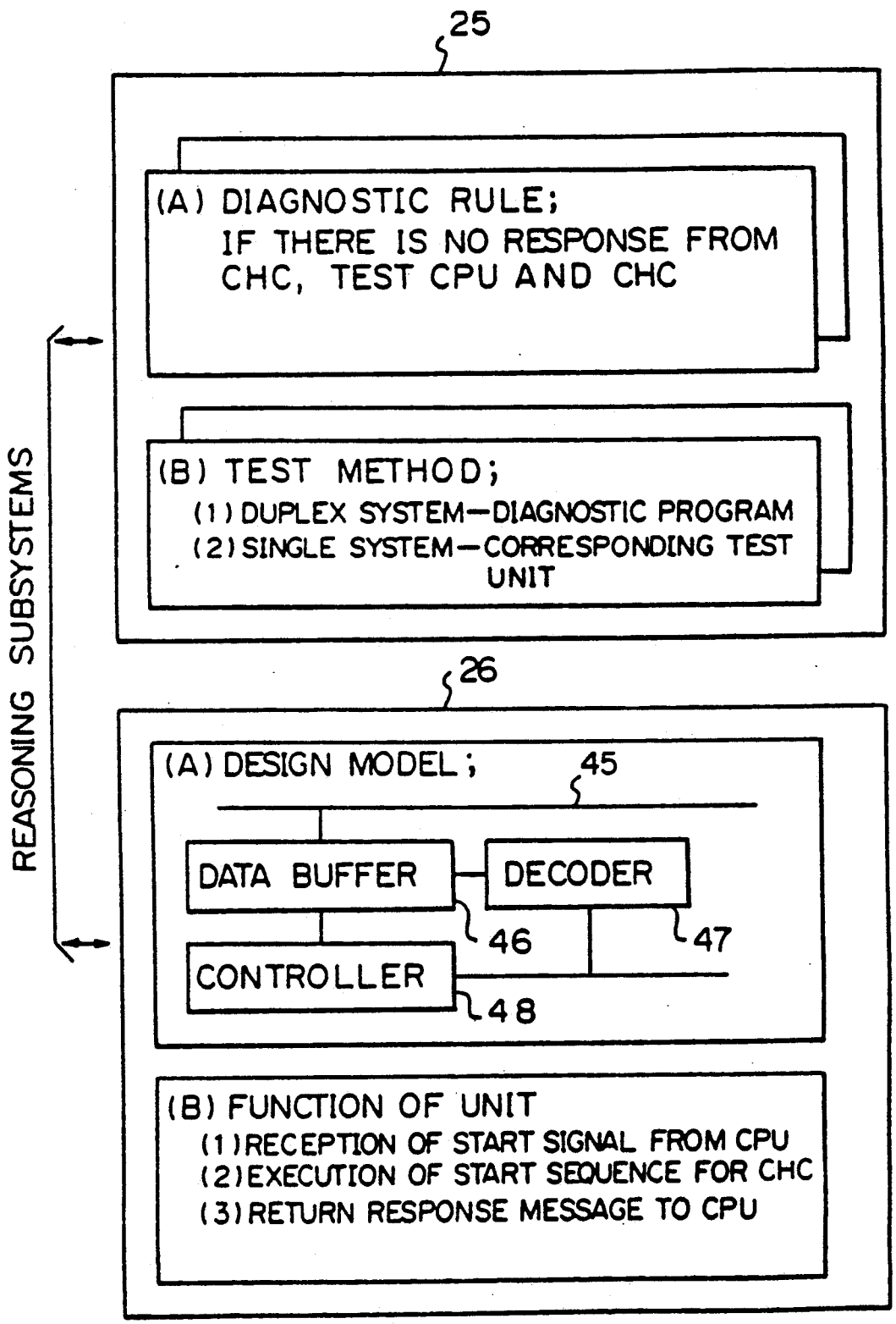
FIG. 7 is a block diagram of exemplary contents of first and second knowledge data bases.

FIGS. 6A and 6B are schematic diagrams for explaining the operation according to an embodiment of the present invention. FIG. 7 illustrates explanatory contents of first and second knowledge data bases. Particularly, FIG. 7 illustrates contents related to dealing with a fault in which no response is returned from the channel control unit (CHC). In general, the first and second diagnostic means identify the questionable object based on a diagnostic rule and, if the thus identified questionable object is constructed in the form of a duplex system having an active part and a stand-by part, a diagnosis is made by starting a self diagnostic program executed by the stand-by part thereof, while, if the questionable object is not formed as a duplex system but a single system, a test is achieved under control of said diagnostic control means and if no fault is found in the questionable object, a reasoning is achieved by using the corresponding processing procedure for this questionable object with reference to the structure data so as to finally specify the target fault unit with reference to the result of the test.

Referring to FIGS. 6A and 6B, the data processing apparatus is comprised of the processor (CPU) 3, the memory (MEM) 4, the channel control units (CHC) 5-1, 5-2 and so on. In response to a start signal from the CPU 3 (see (a)), if a response message is not returned from the CHC (5-1 or 5-2) (see (b)), the reasoning process is generated in such a manner that, first, a diagnostic rule is retrieved; a corresponding test method is retrieved; and an execution of a diagnostic program is displayed, as the repair command.

In the first knowledge data base 25 (FIG. 7 and FIG. 4), the following are accessed, as depicted in FIG. 7.

(A) Diagnostic rule

If there is no response message from the CHC (5-1 or 5-2), a test is executed for the CPU 3 and the CHC (5-1 or 5-2).

(B) Test method (1) If the object is constructed as a duplex system, a diagnostic program should be executed by using a stand-by unit.

(2) If the object is constructed as a single system, the test should be executed by using a corresponding test unit.

Figure 9:
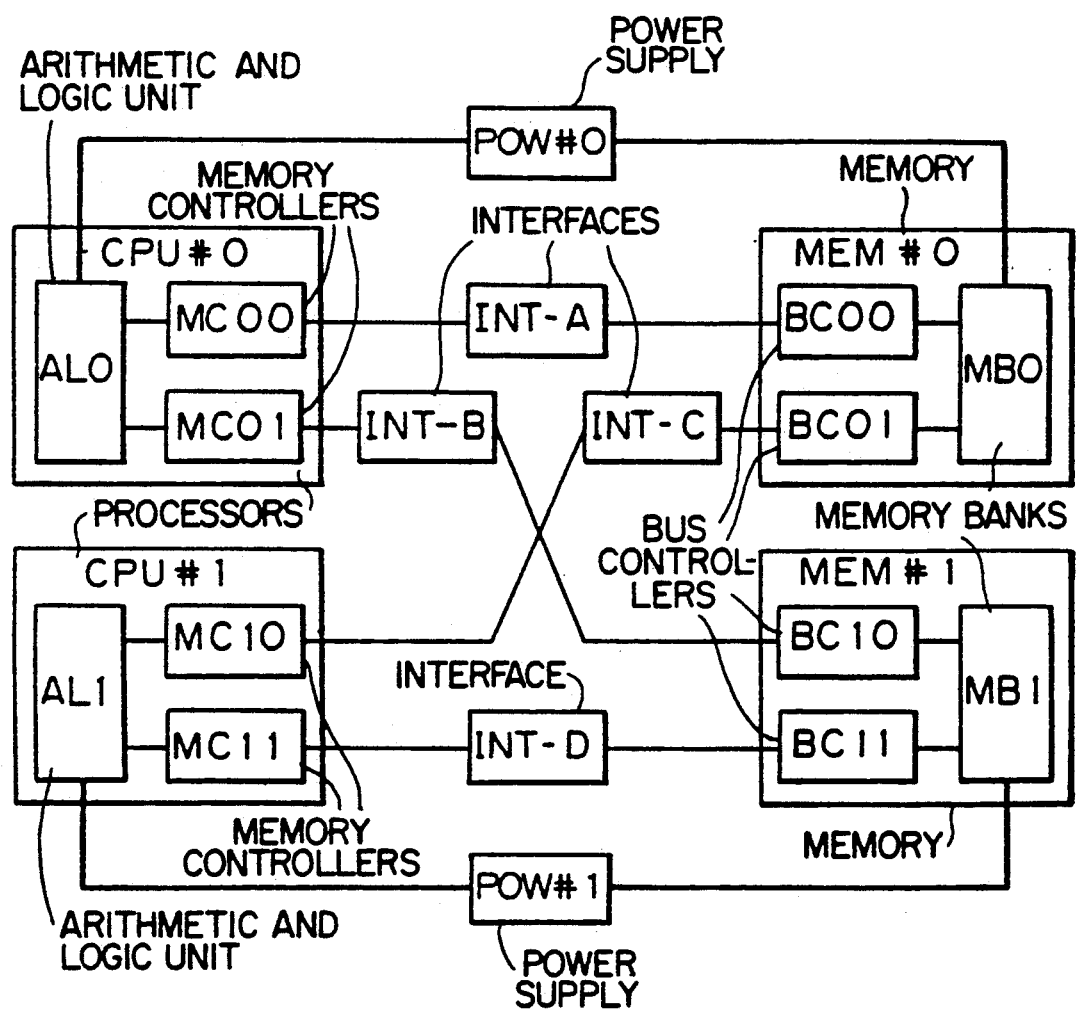
FIG. 9 is a block diagram of an example of a duplex system.

According to the above knowledge, the diagnostic rule instructs to execute a test for the CPU 3 and the CHC (5-1 or 5-2). In this case, the CPU 3 is constructed in the form of a duplex system, as illustrated in FIG. 9 explained later. The CHC's (5-1, 5-2) are also constructed in the form of a duplex system. The memory 4 is also constructed in the form of a duplex system. Therefore, it is decided to execute a diagnostic program for the questionable CPU 3 and CHC 5-1 or 5-2 by using the stand-by CPU 3. As a result of the diagnosis, if the related fault is located, the target questionable package is replaced by a new one. The replacement procedure is displayed on the MM interface unit (shown by 2.3, FIG. 4). After replacement of the faulty package, the diagnostic processing for the fault ends.

In a case where the fault cannot be located through the above mentioned fault location by the use of the first knowledge data base 25, a diagnostic processing follows, based on the design engineer's knowledge, and which is carried out by the reasoning control unit (shown by 32 in FIG. 4). Here, the reasoning is carried out using the second knowledge data base 26 (FIG. 7 and FIG. 4). As for the channel control unit 5-1 or 5-2, the following knowledge is presented therefrom.

(A) Design model

The model indicates a structure connected between, for example, a bus 45, a data buffer 46, a decoder 47 and a controller 48 expressed in terms of the previously mentioned pointer, i.e., an address link.

(B) Function of unit

The function is indicated by the following:

(1) Receiving the start signal from the processor (CPU) 3;
(2) Executing the start sequence for the channel control unit (5-1 or 5-2);
(3) Returning the response message to the CPU 3; and so on.

According to the above knowledge, the circumstance analysis is started first, as shown by step "g" in FIG. 5B. During the analysis, based on both the content of the fault message and the result of the diagnostic program (DP) execution, it is concluded that the fault cannot be detected by the DP execution. Here, a questionable unit (package) is assumed. This is done by extracting the operation, from the function of unit (B), which matches the content of the fault message. In the example, since it is detected that no response message is returned from the CHC (5-1, 5-2), the following operations are extracted.

(1) Fetching an I/0 (7) control instruction;
(2) of the CHC's (5-1, 5-2 ...);
(3) Transmitting the start signal from the CPU 3;
(4) Executing the start sequence; and
(5) Returning the response message from the CHC (5-1 or 5-2).

In general, in the second means (14) the questionable unit is identified and data of a processing procedure corresponding to the thus extracted questionable unit is selected, and the processing procedure is executed from last to first in a reverse direction to search for the faulty unit.

Specifically, in the first means (13), the questionable unit performs a diagnosis by using a self diagnostic program, and if the fault unit is not specified, the second means (14) reasons the faulty unit based on a relationship between the units comprising the data processing apparatus, and a processing procedure for the questionable unit is executed from last to first in a reverse direction.

Referring to FIGS. 6A and 6B, since no response message is returned (refer to (5) in FIG. 6A with the symbol "X", No Good), a hypothesis is set such that the operation (4), i.e., the execution of the start sequence, has not been completed. However, it is judged that the operation (4) has been completed normally based on the result of the diagnostic program (DP) execution, so that it is concluded that the related CHC is normal (refer to (4) with the symbol "O", Good, in FIG. 6A). In conclusion, the thus set hypothesis is cancelled.

Next, a backtrace of the operation by one step is carried out, i.e., (4)→(3). Here, the hypothesis is set such that the operation (3), i.e., the transmission of the start signal, has not been completed. However, since the diagnostic result with respect to the CPU 3 is normal (refer to (3) with the symbol "O" in FIG. 6A), the thus set hypothesis is also cancelled. The next backtrace then follows, i e., (3)→(2) Here, the hypothesis is set such that the operation (2), i.e., selection of the CHC's, has not been completed. However, since the diagnostic result with respect to the CPU 3 is normal (refer to (2) with the symbol "O" in FIG. 6A), the thus set hypothesis is also cancelled, Next a backtrace follows from (2) to (1). The operation (1) fetches the control instruction for the I/0 (7). Here, the hypothesis is set such that the operation (1) is not completed. As for the operation (1), the diagnostic program has not yet been executed under circumstance where the memory 4 is assumed as the questionable unit. Therefore, the repair command indicates to diagnose the memory 4 using the corresponding diagnostic program.

Thus, when the diagnosis is made, based on the reasoning generated by the use of the maintenance technician's knowledge, for the symptom indicating no response from the CHC, the corresponding diagnostic program (DP) is executed for the CPU 3 and the CHC (5-1, 5-2) which are assumed as the questionable units. However, the result of the DP execution suggests no unit to be questionable. Thereby, it is recognized that the memory 4 needs to be diagnosed according to the reasoning generated by the use of the design engineer's knowledge. This makes it possible to locate a fault which has not been located using the maintenance technician's knowledge, i.e., the first knowledge data base 25.

It should be understood that the above mentioned case is taken as an example, and therefore, other faults can be located in accordance with the corresponding fault message. If the fault is not located by the use of the maintenance technician's knowledge, the design engineer's knowledge is introduced to locate the same.

Further, in the above-mentioned example, the backtrace, i.e., (5)→(4)→(3)→(2)→(1) is used for changing the hypothesis. However, a forward trace, i.e., (1)→(2)→(3)→(4)→(5), can also be used for changing the hypothesis. In the latter measure, the corresponding verifications for each hypothesis are, of course, required. The latter measure is useful if the fault is general rather than specific.

Referring again to FIG. 2, assume the abnormality takes place between the input/output (I/O) unit 7-1 and the channel control unit (CHC) 5, while keeping normality between the CHC 5 and the I/O 7-2. In this case, the abnormality cannot be detected through the reasoning generated by the usual maintenance technician's knowledge. According to the present invention, the reasoning with the aid of the design engineer's knowledge is generated taking the structure into account, that is, the I/O 7-1 is connected with the signals lines A, B and C, while the I/O 7-2 is not connected with the signal line C, but the lines A and B only. This generates a reasoning that the signal line C should be diagnosed. Therefore, the fault on the signal e line C, marked with the symbol "X", can be detected.

It should be noted that the present invention can be applied not only to an exchange system, but also to other computer aided systems.

Figure 8A:
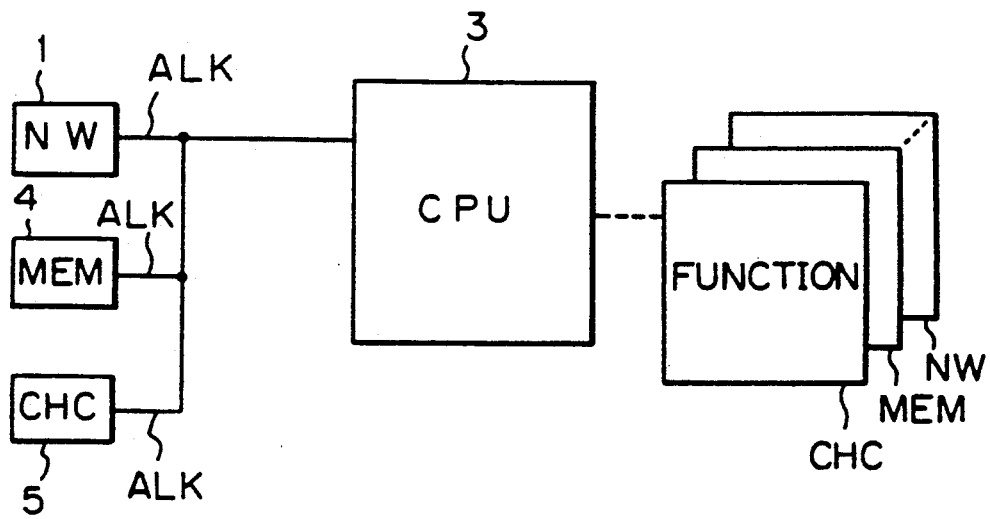
FIGS. 8A, 8B and 8C are block diagrams for explaining a pointer.
Figure 8B:
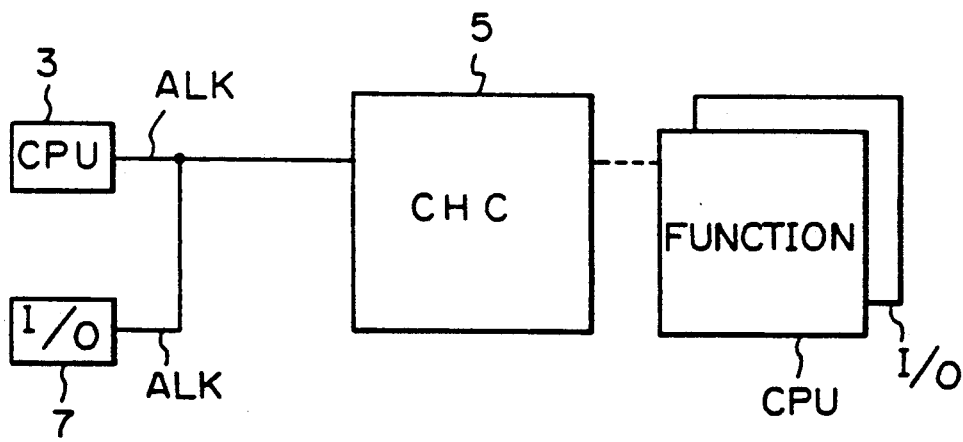
Figure 8C:
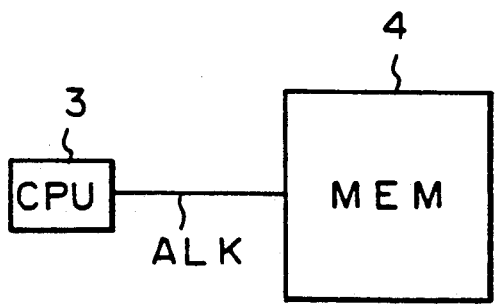

FIGS. 8A, 8B and 8C illustrate block diagrams for explaining a pointer. As mentioned previously, the structure data, used in the second diagnostic means (14), contains information about the connections between the units. The structure data can be expressed in terms of the aforesaid pointers, i.e., the address link numbers. The address link ALK is shown in these figures. The aforesaid function (refer to (a), (b) and (1) through (5) in FIG. 6A and refer to (B) in FIG. 7) are stored in files (refer to the blocks "FUNCTION" in FIGS. 8A and 8B).

FIG. 9 illustrates an example of a duplex system. In general, the data processing apparatus is constructed in the form of a duplex system having an active part and a stand-by part, and a self diagnostic program is executed for the questionable object in the stand-by part side thereof. Further, when a fault is found in the active part of the questionable unit, the faulty part is replaced by the stand-by part thereof. In FIG. 9, members classified with #0 are active parts and members with #1 are stand-by parts. The characters used in the figure are abbreviations representing the following:
CPU: processor
MEM: memory
POW: power supply
INT: interface
AL: arithmetic and logic unit
MC: MEM controller
MB memory bank
BC bus controller FIG. 10 depicts an example of a part of system knowledge. In FIG. 10, "PART-OF" denotes names of parts, "ALK" an address link (refer to FIGS. 8A, 8B and 8C) distinguished by respective numbers, "PARTS" names of packages, "FAULT PROBABILITY" a ratio of probability to produce the fault in the past, i.e., most questionable, "FUNCTION" is identical to that mentioned previously in, for example, FIGS. 8A and 8B.

Figure 11:
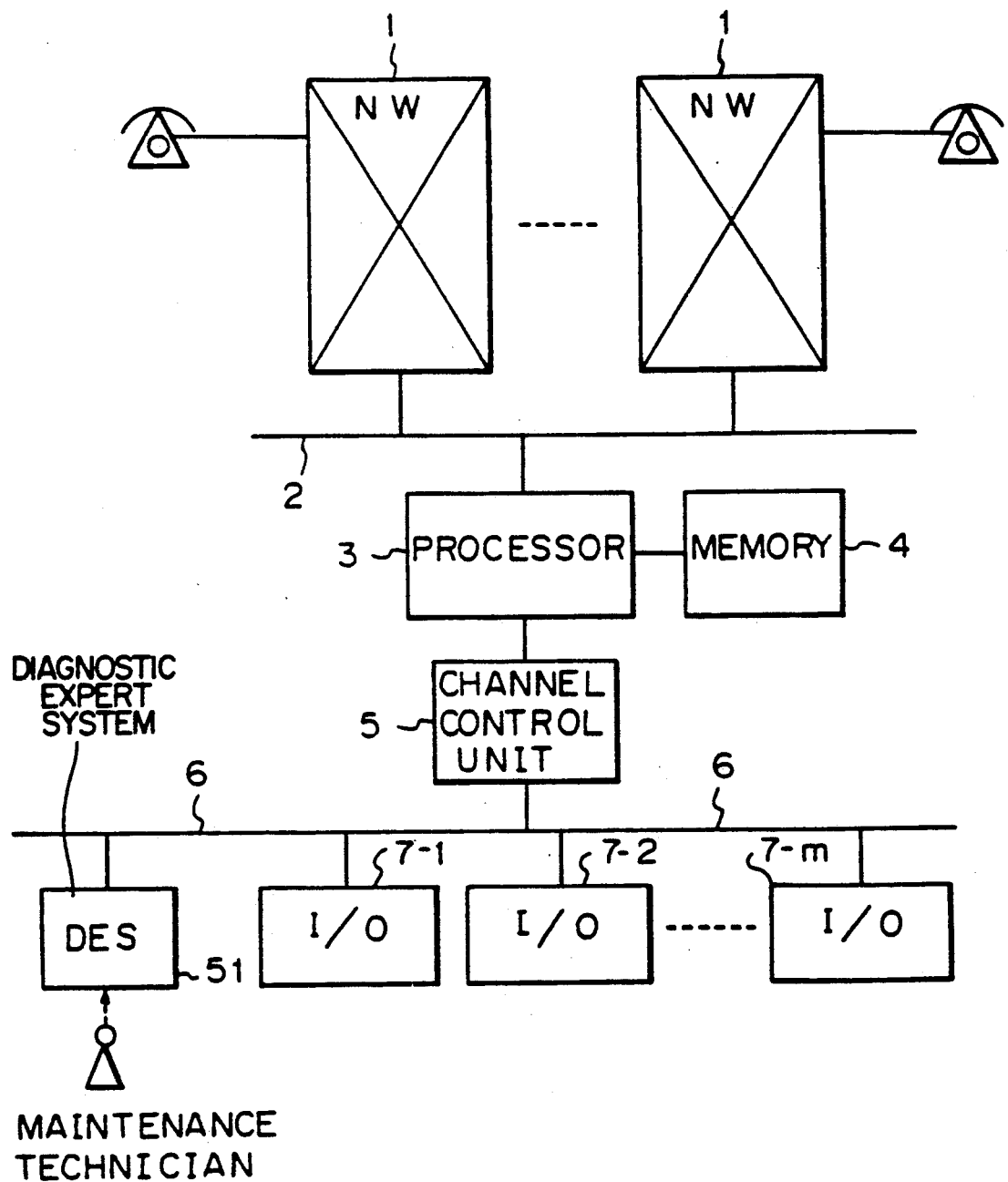
FIG. 11 is a block diagram illustrating a first example showing an arrangement of the diagnostic expert system according to the present invention.

FIG. 11 illustrates a first example showing an arrangement of the diagnostic expert system according to the present invention. In general, the data processing apparatus is connected by way of the bus 6 to the diagnosis expert system (DES) 51 comprised of the first and second diagnostic means (13, 14) so as to receive the fault message from the data processing apparatus and start the related diagnosis. The diagnostic expert system (DES) 51 is directly connected to the common bus 6.

Figure 12:
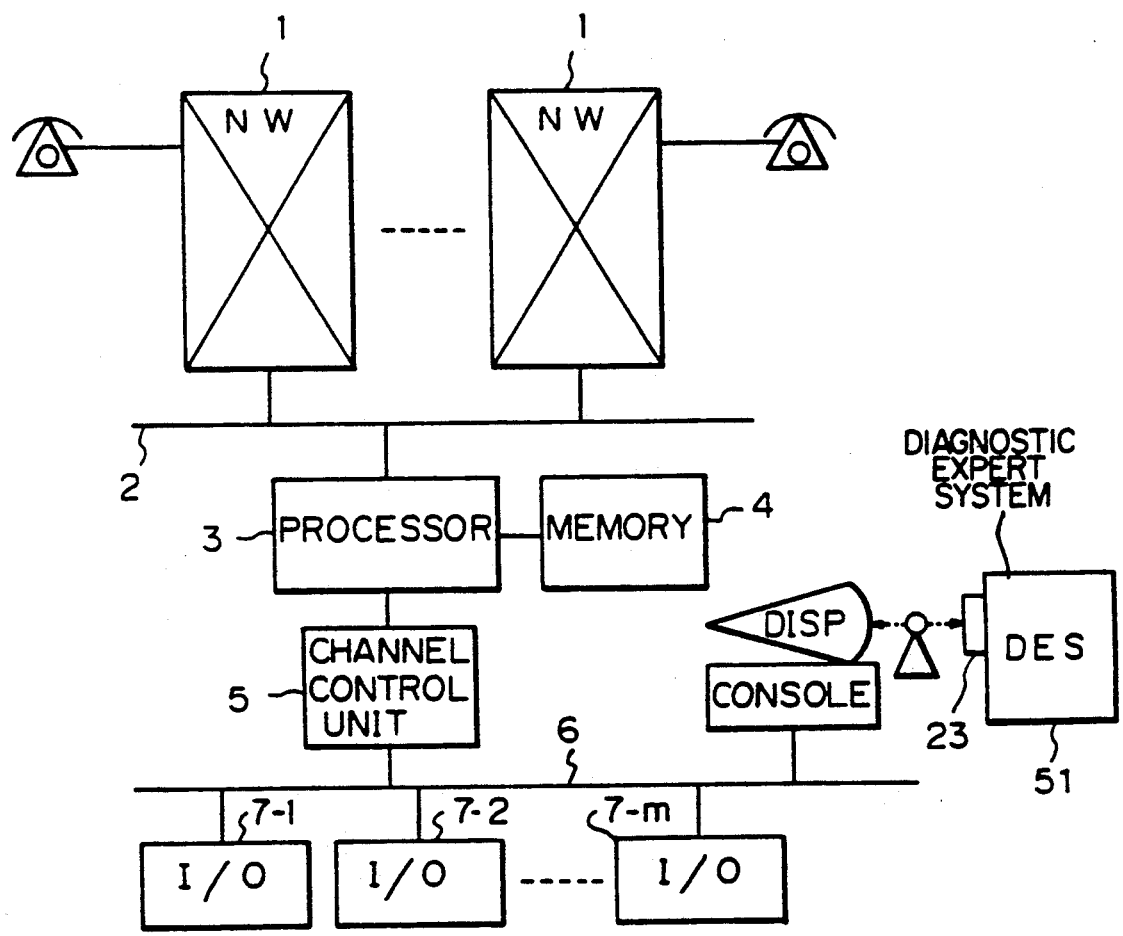
FIG. 12 is a block diagram illustrating a second example showing an arrangement of the diagnostic expert system according to the present invention.

FIG. 12 illustrates a second example showing an arrangement of the diagnostic expert system according to the present invention. In general, the diagnostic expert system (DES) 51 comprised of the first and second means (13, 14) is realized as a work station connected externally from the data processing apparatus which provides the fault message to the work station. The term "work station" is used in FIG. 4. If the common bus 6 shown in FIG. 4 is not used, the system (DES) 51 is located, as the independent work station, externally from the data processing apparatus. The connection between the data processing apparatus and the system (DES) 51 is realized by the communication therebetween performed by the maintenance technician. The maintenance technician watches the fault message from the data processing apparatus, which is displayed on a display device (DISP) via the common bus 6. When the fault message is given the maintenance technician inputs the related symptom information to the MM interface unit 23 (FIG. 4).

Figure 13:
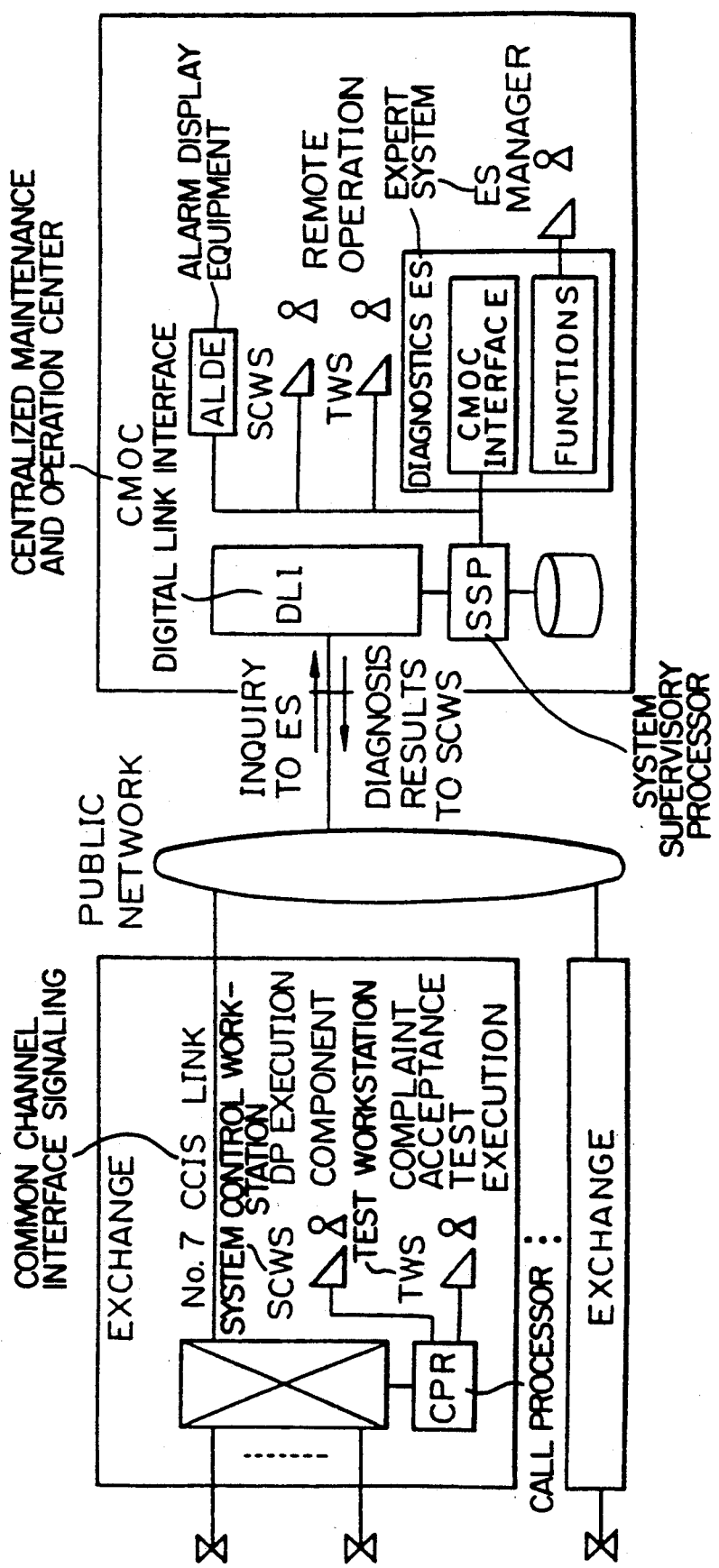
FIG. 13 is a block diagram illustrating an example of an application system according to the present invention.

FIG. 13 shows an example of an application system according to the present invention. The characters used in the figure are abbreviations representing the following:
CMOC: centralized maintenance and operation center
DLI: Digital link interface equipment
SSP: system supervisory processor
ALDE: Alarm display equipment
ES: Expert system
SCWS: system control workstation
TWS: test workstation
CPR: call processor
CCIS: common channel interface signaling Efficient diagnosis is achieved by establishing the expert system in the CMOC and cooperating with the SCWS and the TWS. If a fault occurs in a switching system and the maintenance technicians in its exchange cannot repair the fault with the SCWS and the TWS, they request diagnosis from the maintenance technicians in the CMOC through the SCWS or the TWS. The expert system collects the information needed for the diagnosis from the CMOC system, infers the faulty parts, and transmits the result of the diagnosis to the SCWS or the TWS. The engineer managing the expert system and its knowledge base will be stationed in the CMOC.

Figure 14:
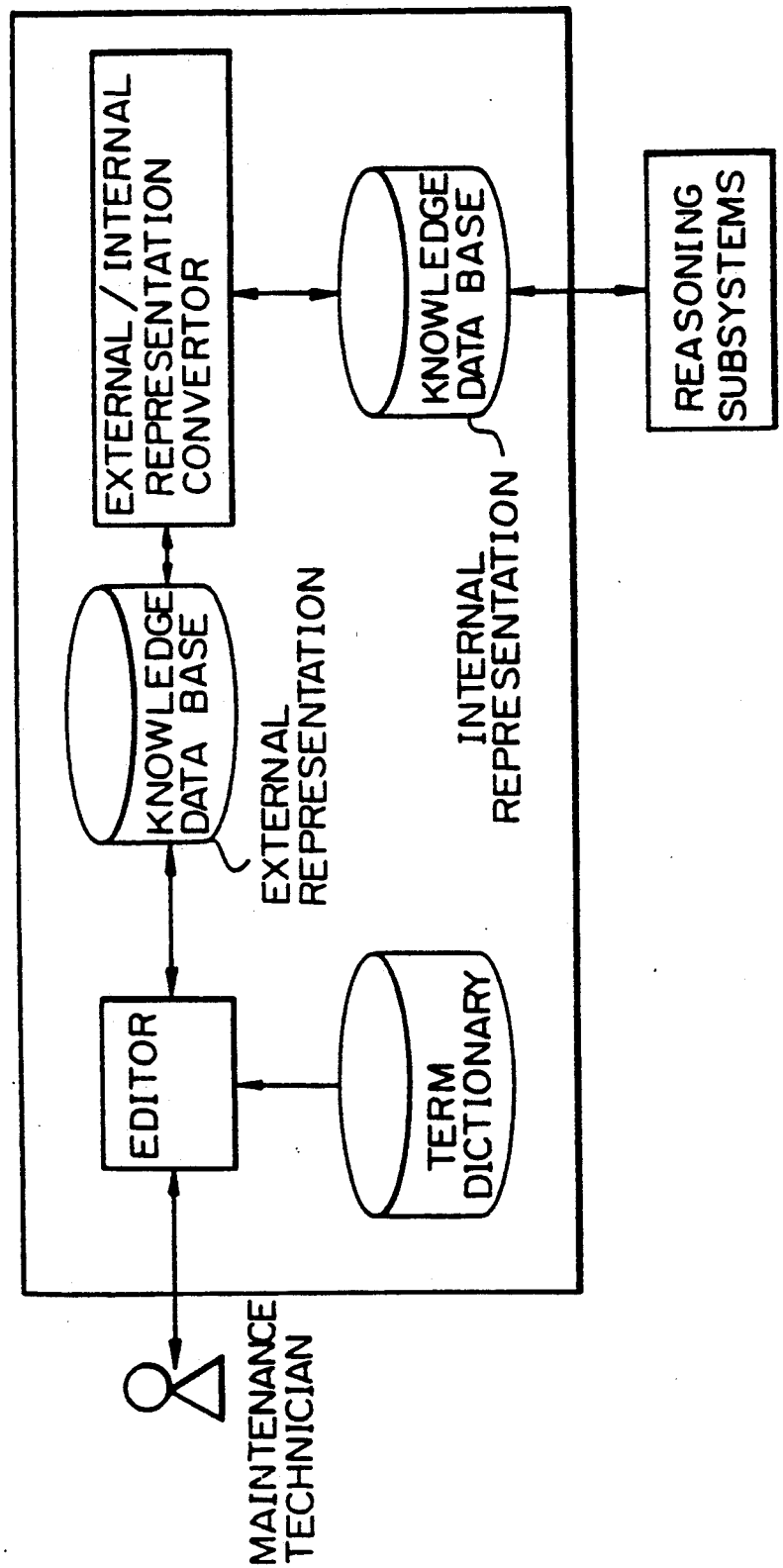
FIG. 14 schematically depicts an example of a system for managing the knowledge data base.

FIG. 14 schematically depicts an example of a system for managing the knowledge data base. The system of FIG. 14 corresponds to the block 28 shown in FIG. 4.

User-friendly functions are necessary to enable the maintenance technicians to add or change the knowledge by themselves. The following function will meet this requirement.

That is, the knowledge which a user describes or edits is represented in a natural language based external representation. The external representation is translated automatically into the internal representation prepared for reasoning. This enables the user to add or edit the knowledge with the external representation only. A user can also register the words and synonyms necessary for describing the knowledge, so that the knowledge representation is flexible.

An example of the external representation will be given below.
IF (R3) : (AUTONOMOUS-MESSAGE) IS (11)
  $AND$ (SELF MEM) OF (SBY-CPU) IS (OUS)
  THEN D (SBY-CPU POWER-DOWN) .

The above exemplifies one pair of IF-THEN sentences. R3 denotes a rule 3 used for an identification. SELF MEM denotes a self memory. OUS denotes an out of service condition. SBY denotes a stand-by condition. The characters in parentheses are stored in the term dictionary. The underlined portions are keywords for building the sentence. The user can freely select the terms in parentheses. The character $ is also used as a keyword. In the above example, the fault message belongs to number "11". Further, simultaneously (AND), the self memory cooperating with the stand-by CPU is now out of service. The stand-by CPU is then assumed to be powered down.

As explained above in detail, the diagnostic expert system can help provide very high grade maintenance and can locate a fault which cannot be located even by maintenance technicians.

We claim:

1. A diagnostic expert system for diagnosing a data processing apparatus having a control unit, memory unit, and input/output unit, according to a fault message issued from the apparatus due to a fault occurring therein, comprising:
   diagnostic memory means for storing therein both diagnostic data and structure data;
   diagnostic control means for maintaining the diagnostic data;
   first diagnostic means for performing automated reasoning to determine a questionable object, based on both said fault message and said diagnostic data and for diagnosing the questionable object; and
   second diagnostic means for hypothesizing the questionable object based on the structure data regarding the data processing apparatus, a related faulty object being specified by said first diagnostic means when possible and, if the related faulty object cannot be specified by said first diagnostic means, said second diagnostic means specifies the related faulty object,
   wherein in said second diagnostic means, the questionable object is identified, and then data of a processing procedure corresponding to the questionable object is selected, and the processing procedure is executed from last to first in a reverse direction to search for the related faulty object.

2. A diagnostic expert system as set forth in claim 1, wherein the diagnostic data is defined by each said fault message in correspondence with a related questionable object.

3. A diagnostic expert system as set forth in claim 1, wherein the structure data define a connection relationship between the control, memory and input/output units comprising the data processing apparatus in accordance with design information for constructing the data processing apparatus.

4. A diagnostic expert system as set forth in claim 3, wherein the design information includes definition of each combination of both a connection relationship between the control, memory and input/output units comprising the data processing apparatus and a processing procedure between the control, memory and input/output units for every processing procedure.

5. A diagnostic expert system as set forth in claim 1, wherein the questionable object is determined by the automated reasoning of said first diagnostic means based on both the fault message and the diagnostic data, and then the questionable object is subjected to execution of a self diagnostic program to carry out a diagnosis.

6. A diagnostic expert system as set forth in claim 1, wherein the data processing apparatus also has a bus connecting the control, memory and input/output units, and
   wherein said first and second diagnostic means are provided in a diagnostic apparatus connected via the bus to receive the fault message from the data processing apparatus and start a related diagnosis in response thereto.

7. A diagnostic expert system as set forth in claim 1, wherein said first and second diagnostic means are provided in a work station separate from and connected to the data processing apparatus to receive the fault message.

8. A diagnostic expert system as set forth in claim 1, wherein the data processing apparatus is a duplex data processing apparatus having an active part and a stand-by part, and a self-diagnostic program is executed for the questionable object in the stand-by part.

9. A diagnostic expert system as set forth in claim 8, wherein, if the fault is found in the active part of the questionable object, the related faulty object is replaced by a related functioning object in the stand-by part.

10. A diagnostic expert system as set forth in claim 1, wherein said first and second diagnostic means identify the questionable object based on a diagnostic rule contained in said diagnostic data and, when the questionable object is in a duplex system having an active part and a stand-by part, a diagnosis is made by starting a self-diagnostic program executed by the stand-by part and, when the questionable object is not a duplex system but a single system not having a standby part, a test is achieved under control of said diagnostic control means and, when no fault is found in the questionable object, the automated reasoning is performed by using a corresponding processing procedure for the questionable object with reference to the structure data to finally specify the related faulty object with reference to the test.

11. A diagnostic expert system as recited in claim 1, further comprising a standby part capable of performing self-diagnosis.

12. A diagnostic expert system for diagnosing a data processing apparatus having a control unit, memory unit, and input/output unit, according to a fault message issued from the apparatus due to a fault occurring therein, comprising:
   diagnostic memory means for storing therein both diagnostic data and structure data;
   diagnostic control means for maintaining the diagnostic data;
   first diagnostic means for performing automated reasoning to determine a questionable object, based on both said fault message and said diagnostic data and for diagnosing the questionable object; and
   second diagnostic means for hypothesizing the questionable object based on the structure data regarding the data processing apparatus, a related faulty object being specified by said first diagnostic means when possible and, if the related faulty object cannot be specified by said first diagnostic means, said second diagnostic means specifies the related faulty object;
   said first diagnostic means diagnosing the questionable object by using a self diagnostic program, and if the related faulty object is not specified, said second diagnostic means determines the related faulty object by performing automated reasoning based on a connection relationship between the control, memory and input/output units comprising the data processing apparatus, and a processing procedure for the questionable object is executed from last to first in a reverse direction.

13. A diagnostic expert system for diagnosing a data processing apparatus having a control unit, memory unit, and input/output unit, according to a fault message issued from the apparatus due to a fault occurring therein, comprising:
- diagnostic memory means for storing therein both diagnostic data and structure data;
- diagnostic control means for maintaining the diagnostic data;
- first diagnostic means for performing automated reasoning to determine a questionable object, based on both said fault message and said diagnostic data and for diagnosing the questionable object; and
- second diagnostic means for hypothesizing the questionable object based on the structure data regarding the data processing apparatus, a related faulty object being specified by said first diagnostic means when possible and, if the related faulty object cannot be specified by said first diagnostic means, said second diagnostic means specifies the related faulty object;
- said first diagnostic means including
  - a first part for receiving the fault message, translating the fault message into a corresponding fault number and retrieving a diagnostic rule contained in the diagnostic data using the corresponding fault number, and
  - a second part for identifying the questionable object based on the diagnostic rule and starting execution of a test program corresponding to the questionable object to carry out a self-diagnosis, and
- wherein said second diagnostic means also includes
  - a third part identifying an object corresponding to the fault message as the questionable object based on the automated reasoning performed by said first diagnostic means,
  - a fourth part performing a backtrace of a processing procedure step by step with respect to the questionable object, and
  - a fifth part specifying the questionable object identified as a result of the self-diagnosis achieved in said first diagnostic means.

14. A diagnostic expert system for diagnosing a data processing apparatus having a control unit, memory unit and input/output unit, according to fault messages issued from the apparatus due to faults occurring therein, comprising:
- a first knowledge data base containing therein diagnostic rules, created by maintenance technicians, the diagnostic rules defining causes of each fault in connection directly with at least one of the fault messages;
- a second knowledge data base, created by design engineers, containing therein data relating to structure and function of the data processing apparatus;
- a first reasoning subsystem for performing automated reasoning with an objective of determining a questionable object liable to cause a corresponding fault based upon a receive fault message with reference to said first knowledge data base; and
- a second reasoning subsystem for performing automated reasoning to determine the questionable object with reference to said second knowledge data base when the questionable object is not found by the automated reasoning performed by said first reasoning subsystem, a circumstance analysis is carried out by said second reasoning subsystem with reference to the automated reasoning performed by said first reasoning subsystem, and according to the circumstance analysis, a hypothesis regarding the questionable object is generated and verified to find a target faulty object,
- wherein in said second reasoning subsystem, the questionable object is identified and a processing procedure corresponding to the questionable object is selected, and the processing procedure is executed from last to first in a reverse direction to search for the target faulty object.

15. A diagnostic expert system as set forth in claim 14, wherein each of said diagnostic rules is defined by one of the fault messages in correspondence with a related questionable object, and
wherein the data in said second knowledge data base consists of data defining each combination of a connection relationship between the control, memory and input/output units comprising the data processing apparatus and a processing procedure between the control, memory and input/output units for every type of processing.

16. A diagnostic expert system as set forth in claim 14, wherein the questionable object is reasoned by said first reasoning subsystem based on both the received fault message and the diagnostic rules and the questionable object is subjected to execution of a self-diagnostic program to carry out a diagnosis.

17. A diagnostic expert system as set forth in claim 14, wherein said first and second reasoning subsystems identify the questionable object based on the diagnostic rules and, when the questionable object is constructed as a duplex system having a main part and a stand-by part, a diagnosis is made by starting a self-diagnostic program executed by the stand-by part thereof, when the questionable object is not a duplex system but a single system, a test is carried out under control of said diagnostic control means cooperating with said first and second reasoning subsystems, and when no fault is found in the questionable object, the automated reasoning is achieved by using a corresponding processing procedure for the questionable object with reference to the data to finally specify the target faulty object with reference to the automated reasoning of said first reasoning subsystem.

18. A diagnostic expert system as set forth in claim 14, wherein said first reasoning subsystem includes an expert shell reasoning unit to perform the automated reasoning with reference to said first knowledge data base.

19. A diagnostic expert system as set forth in claim 18, wherein said second reasoning subsystem includes a design knowledge reasoning unit to perform the automated reasoning with reference to the second knowledge base.

20. A diagnostic expert system as set forth in claim 19, further comprising a reasoning explanation unit for outputting explanations of the automated reasonings from said first and second reasoning subsystems to a maintenance technician.

21. A diagnostic expert system as set forth in cl aim 14, further comprising a knowledge base management unit for managing the diagnostic rules and the data in said first and second knowledge data bases, respectively.

22. A diagnostic expert system for diagnosing a data processing apparatus having a control unit, memory unit and input/output unit, according to fault messages issued from the apparatus due to faults occurring therein, comprising:
- a first knowledge data base containing therein diagnostic rules, created by maintenance technicians, the diagnostic rules defining causes of each fault in connection directly with at least one of the fault messages;
- a second knowledge data base, created by design engineers, containing therein data relating to structure and function of the data processing apparatus;
- a first reasoning subsystem for performing automated reasoning with an objective of determining a questionable object liable to cause a corresponding fault based upon a received fault message with reference to said first knowledge data base; and
- a second reasoning subsystem for performing automated reasoning to determine the questionable object with reference to said second knowledge data base when the questionable object is not found by the automated reasoning performed by said first reasoning subsystem, a circumstance analysis is carried out by said second reasoning subsystem with reference to the automated reasoning performed by said first reasoning subsystem, and according to the circumstance analysis, a hypothesis regarding the questionable object is generated and verified to find a target faulty object;
- said first reasoning subsystem including
  - first means for receiving the fault messages, for translating each fault message into a corresponding fault number and for retrieving a diagnostic rule using the corresponding fault number; and
  - second means for identifying the questionable object based on the diagnostic rule and starting execution of a test program corresponding to the questionable object to carry out a self-diagnosis, and
- wherein said second reasoning subsystem includes
  - third means for identifying an object corresponding to one of the fault messages as the questionable object based on the automated reasoning performed by said first reasoning subsystem,
  - fourth means for performing a backtrace of a processing procedure step by step with respect to the questionable object, and
  - fifth means for specifying the questionable object identified as a result of the self-diagnosis achieved in said first reasoning subsystem.

23. A method of diagnosing a fault occurring in an operating device having components, comprising the steps of:
(a) storing diagnostic data relating to the operating device;
(b) storing structure data defining relationships between the components of the operating device;
(c) evaluating the diagnostic data in a data processing apparatus with an objective of identifying a potential source of the fault;
(d) evaluating the structure data to hypothesize the potential source of the fault, in dependence upon said evaluating in step (c); and
(e) executing a processing procedure corresponding to the potential source in reverse direction to determine the source of the fault.

24. A method as set forth in claim 23, wherein said storing in step (a) includes the step of defining the diagnostic data by a correspondence between at least one fault indication generated by the operating device and a cause of the fault indication.

25. A method as recited in claim 23, wherein said storing in step (b) comprises the steps of:
(b1) defining each of the structure data by a physical connection relationship between at least two of the components of the operating device; and
(b2) defining for each of the structure data a processing procedure shared by the at least two of the components of the operating device.

26. A method as recited in claim 23, further comprising the step of (e) executing self-diagnostics in the operative device to obtain information on the potential source of the fault.

27. A method as recited in claim 26, wherein step (c) comprises the steps of:
(c1) retrieving a diagnostic rule from the diagnostic data based on a received fault message; and
(c2) executing self-diagnostics on a potentially faulty component corresponding to the potential source of the fault indicated by the diagnostic rule retrieved in step (c1).

28. A method as recited in claim 27, wherein said operating device is a duplex data processing device having stand-by parts, wherein said method further comprises the step of:
(f) replacing the potentially faulty part by one of the stand-by parts, and
wherein said executing of the self-diagnostics in step (c2) is performed on the potentially faulty part after said replacing in step (f).

29. A method as recited in claim 23,
further comprising the step of (e) executing self-diagnostics within the potential source, and
wherein said evaluating in step (d) evaluates the relationships defining connections between the components of the operating device when said executing of the self-diagnostics in step (e) does not identify the source of the fault.

30. A method as recited in claim 23, wherein the structure data is obtained from design engineering experience.

* * * * *